(12) United States Patent
Varela et al.

(10) Patent No.: US 7,954,832 B2
(45) Date of Patent: Jun. 7, 2011

(54) INTERNAL STIFFENER FOR HOLLOW STRUCTURE

(75) Inventors: Tomaz D. Varela, Shelby Township, MI (US); James Trotter, Auburn Hills, MI (US); Xinyu Wen, Shelby Township, MI (US); Kou Yang, Goodrich, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 243 days.

(21) Appl. No.: 12/192,178

(22) Filed: Aug. 15, 2008

(65) Prior Publication Data

US 2010/0038874 A1    Feb. 18, 2010

(51) Int. Cl.
*B60B 35/00* (2006.01)
*B60G 9/00* (2006.01)
(52) U.S. Cl. ............... 280/124.1; 74/607; 301/124.1
(58) Field of Classification Search .......... 280/124.1, 280/124.116, 124.128, 124.156, 124.175, 280/798; 301/124.1, 130; 74/607; 403/274, 403/277, 279, 281, 282
See application file for complete search history.

(56) References Cited

U.S. PATENT DOCUMENTS

| | | | |
|---|---|---|---|
| 4,895,350 A | 1/1990 | Schoof et al. | |
| 5,458,393 A * | 10/1995 | Benedyk | 296/203.01 |
| 5,862,877 A * | 1/1999 | Horton et al. | 180/312 |
| 6,255,631 B1 * | 7/2001 | Kichline et al. | 219/617 |
| 6,813,818 B2 * | 11/2004 | Schmidt | 29/419.2 |
| 2001/0000119 A1 * | 4/2001 | Jaekel et al. | 296/29 |
| 2006/0001312 A1 * | 1/2006 | MacKarvich | 301/124.1 |
| 2006/0244236 A1 | 11/2006 | Cortez et al. | |
| 2006/0284432 A1 * | 12/2006 | Hashimoto et al. | 293/154 |
| 2008/0001379 A1 * | 1/2008 | Myers et al. | 280/124.156 |

FOREIGN PATENT DOCUMENTS

WO    06116513    4/2006

* cited by examiner

*Primary Examiner* — Paul N Dickson
*Assistant Examiner* — Joseph Rocca
(74) *Attorney, Agent, or Firm* — Carlson, Gaskey & Olds, PC

(57) ABSTRACT

An axle beam includes a hollow beam body with at least first and second apertures formed in opposing wall portions of the hollow beam body. A stiffener is received within the first and second apertures and is fixed to the hollow beam body at an attachment interface.

12 Claims, 3 Drawing Sheets

INTERNAL STIFFENER FOR HOLLOW STRUCTURE

TECHNICAL FIELD

The subject invention relates to a stiffener member that is installed within a hollow beam structure to increase strength.

BACKGROUND OF THE INVENTION

Hollow beam structures for axles are desirable over solid beam structures due to their reduced weight. The hollow structures typically provide sufficient strength due to their large section modulus with efficient distribution of material. Hollow beam structures are particularly useful for heavy duty truck applications. Typically, either round or rectangular shaped beams are used, which offer sufficient bending strength overall; however, additional structures may be required at locations where other vehicle components are mounted, such as suspension components for example, to provide increased strength.

One proposed solution has been to use local stiffeners to strengthen the mount interface for attachment of suspension components. As the hollow beam structures are closed, it is often difficult to provide efficient local stiffeners in terms of both weight and cost. One known configuration provides a two-piece structure that forms the hollow beam structure. A C-shaped beam portion is utilized and a bottom plate is subsequently attached to form the final enclosed hollow beam structure. Prior to attachment of the bottom plate, a tube is positioned within the hollow cavity such that tube ends abut against inner wall surfaces of the hollow beam structure. The tube is then welded to the wall surfaces and then the bottom plate can be installed. This process is time consuming and adds cost and complexity to the assembly process.

SUMMARY OF THE INVENTION

An axle beam includes a stiffener to increase the strength of the axle beam. In on example, the axle beam comprises a hollow beam body that includes at least first and second apertures formed in opposing wall portions of the hollow beam body. The stiffener is received within the first and the second apertures and is fixed to the hollow beam body at an attachment interface.

In one example, a method of forming the axle beam includes the steps of: providing the hollow beam body; forming a first aperture in a first wall portion of the hollow beam body and a second aperture in a second wall portion of the hollow beam body opposite from the first wall portion; inserting the stiffener into the first and the second apertures; and fixing the stiffener to the hollow beam body at an attachment interface.

In one example, the attachment interface comprises a weld attachment interface.

In on example, the attachment interface comprises a pres-fit attachment interface.

In one example, the stiffener comprises a tubular stiffener that has an inner peripheral surface and an outer peripheral surface.

In one example, the tubular stiffener is radially expanded subsequent to insertion in the first and second apertures. This expansion forms a shoulder portion on the tubular stiffener that provides a mechanical lock to prevent the tubular stiffener from being removed from the axle beam.

These and other features of the present invention can be best understood from the following specification and drawings, the following of which is a brief description.

DETAILED DESCRIPTION OF THE PREFERRED EMBODIMENT

Figure 1:
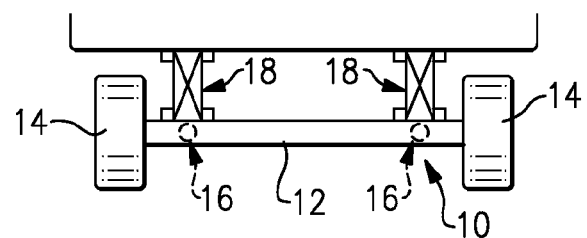
FIG. 1 is a schematic representation of an axle assembly.

FIG. 1 is a schematic representation of an axle assembly 10 with an axle beam 12 extending between a pair of laterally spaced wheels 14. The axle beam 12 has a hollow structure and at least one stiffener 16 is incorporated into the axle beam 12 to increase strength. In one example, stiffeners 16 are installed in the axle beam 12 at locations where other vehicle components, such as suspension components 18 for example, are located to increase strength at this mounting interface.

The axle beam 12 shown is a non-drive axle; however, the stiffeners 16 could be utilized in any type of hollow axle beam structure for drive axles, non-drive axles, trailer axles, etc. The suspension components 18 are schematically shown in FIG. 1 and can comprise any type of suspension component. Further, the location of the components on the axle beam and the number of mounting interfaces for the components could vary depending upon vehicle application. Also, multiple stiffeners could be utilized at one location or stiffeners could be located at multiple locations within the axle beam 12 where additional strength may be required.

The axle beam 12 can have any of various different cross-sections including polygonal, round, or oval cross-sections, for example. In the examples shown in FIGS. 2-6, the axle beam has a rectangular cross-section.

Figure 2:
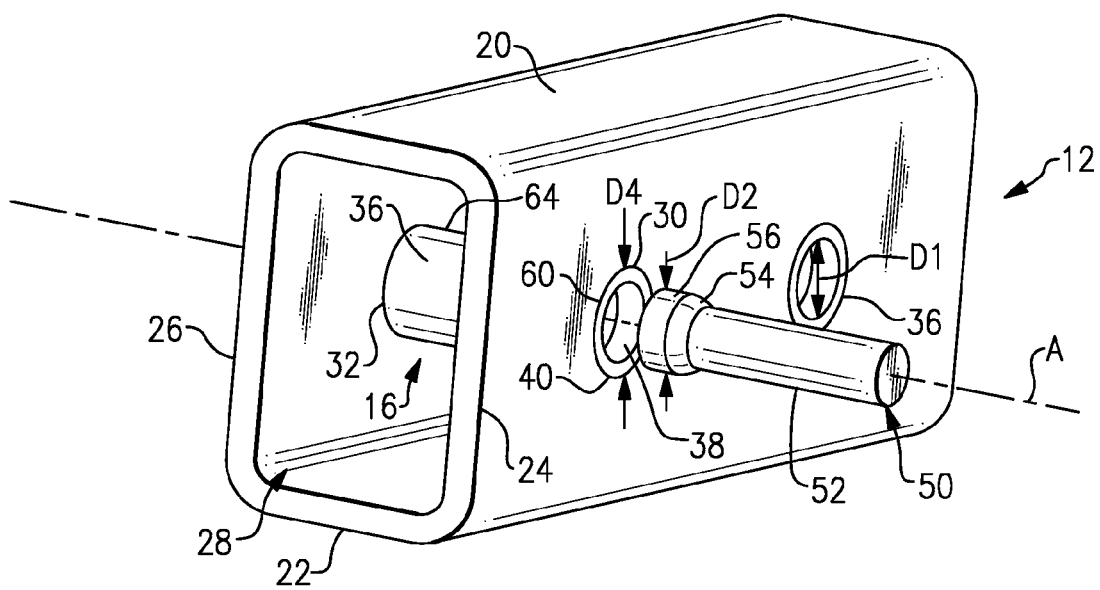
FIG. 2 is a partial perspective view of one example of a hollow beam structure and stiffener in a first assembly step.
Figure 3:
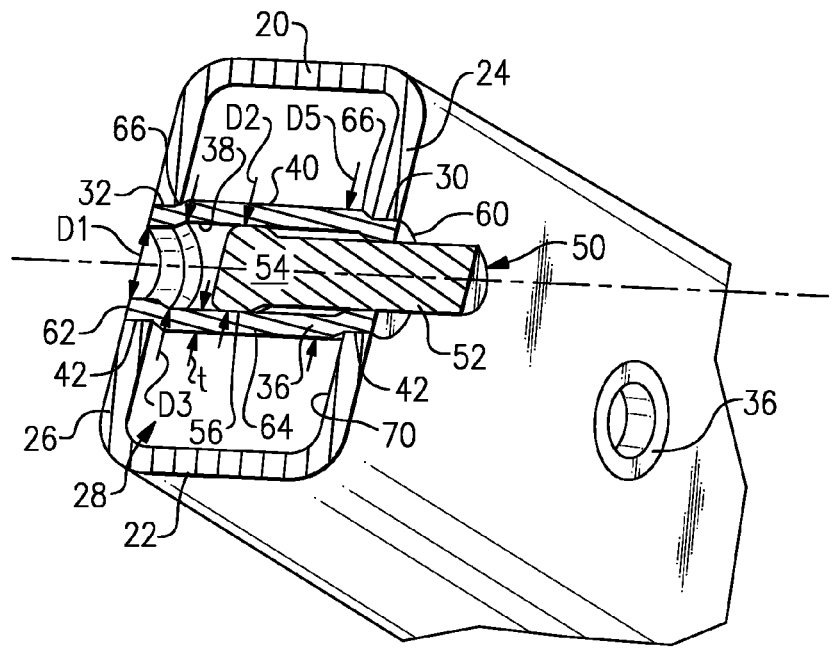
FIG. 3 is a cross-sectional view of the example of FIG. 2 showing a subsequent assembly step.
Figure 4:
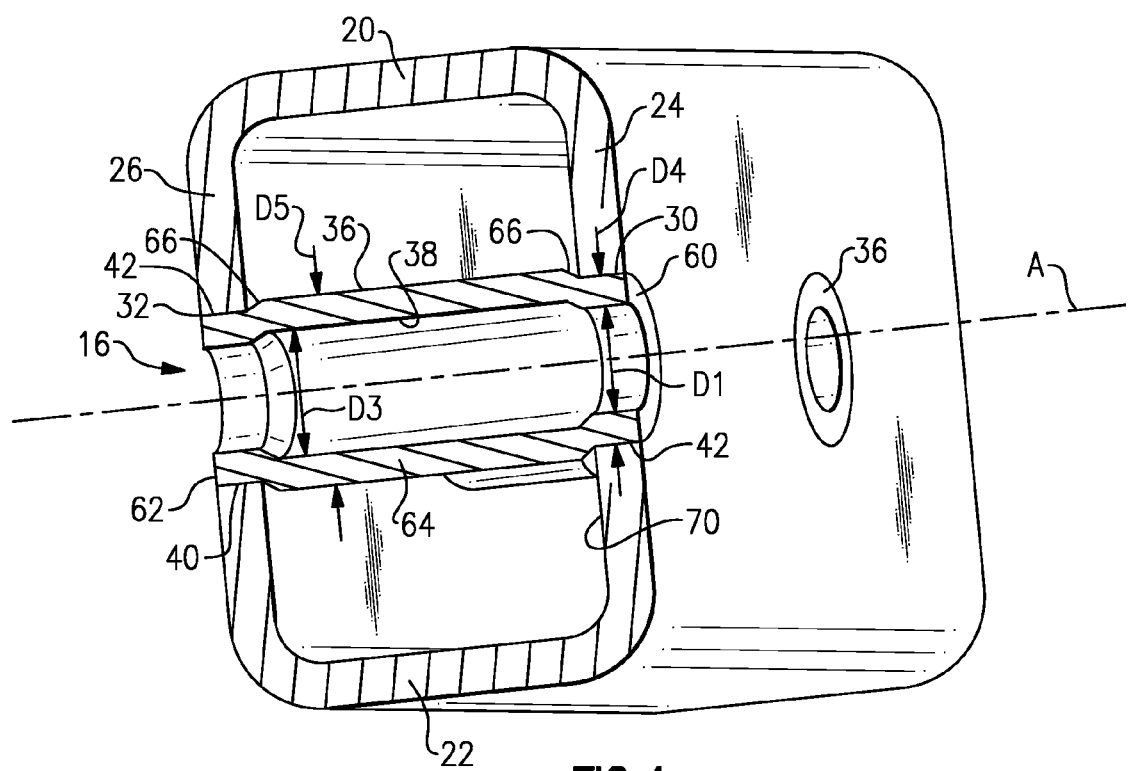
FIG. 4 is a cross-sectional view of the example of FIG. 2 showing a final installation of the stiffener.

One example of a stiffener 16 installed in the axle beam 12 is shown in FIGS. 2-4. The axle beam 12 has an upper wall 20, a lower wall 22, a first side wall 24, and a second side wall 26 that is opposite of the first side wall 24. The upper wall 20, lower wall 22, and first 24 and second 26 side walls cooperate to define a single-piece completely enclosed hollow beam body that defines a hollow cavity 28 bounded by the walls.

The first side wall 24 includes a first aperture 30 and the second side wall 26 includes a second aperture 32. In the example shown, the first 30 and second 32 apertures are formed by drilling and are aligned with each other. Other methods could also be used to form the apertures.

In this example, the stiffener 16 comprises a metal sleeve or tube 36 that is inserted into the first 30 and second 32 apertures. The tube 36 has a center axis A and is defined by an inner peripheral surface 38 and an outer peripheral surface 40 that is spaced from the inner peripheral surface 38 in a radial direction extending away from the center axis A to define a wall thickness t. When installed within the first 30 and second 32 apertures, the outer peripheral surface 40 is in direct abutting engagement with a surface 42 that defines and bounds the first 30 and second 32 apertures, see FIG. 3.

In the examples shown in FIGS. 2-5 the tube 36 is radially expanded to form a press-fit attachment interface, i.e. interference fit, within the first 30 and second 32 apertures. This securely holds/fixes the tube 36 to the axle beam 12. The radial expansion can be accomplished by any of various methods.

For example, in the example shown in FIGS. 2-4, a tool 50 is used to radially expand the tube 36. When the tube 36 is initially inserted in the first 30 and second 32 apertures, the inner peripheral surface 38 of the tube 36 is defined by an initial inner diameter D1. This initial inner diameter D1 is generally constant along the length of the tube 36. The tool 50 includes a body portion 52 that transitions into an enlarged head portion 54 that has an outer peripheral surface 56 that is defined by a tool diameter D2. The tool diameter D2 is greater than the initial inner diameter D1 as shown in FIG. 3.

The tube 36 includes a first tube end 60 received within the first aperture 30 and a second tube end 62 that is received within the second aperture 32. A central portion 64 of the tube 36 extends between the first 60 and second 62 tube ends, and extends across the hollow cavity 28. The first 60 and second 62 ends of the tube 36 are slightly expanded during radial expansion to form the press-fit, and the central portion 64 is more substantially expanded to form a mechanical lock. This will be discussed in greater detail below.

When the tool 50 is pressed into the tube 36 as shown in FIG. 3, the outer peripheral surface 56 of the tool 50 directly abuts against the inner peripheral surface 38 of the tube 36. The tool 50 can be pressed within the tube 36 using any type of known actuator, such as a press, for example. As the tool 50 is pressed through the first aperture 30 in the first side wall 24, the enlarged head portion 54 enters the hollow cavity 28. This expands the central portion 64 more than it expands the first end 60 and second end 62 of the tube 36 to form a mechanical lock. The mechanical lock comprises a shoulder 66 that transitions from the central body portion 64 to each of the first 60 and second 62 ends of the tube 36.

During expansion, the initial inner diameter D1 of the tube 36 is increased to an installed inner diameter D3 that is greater than the initial inner diameter D1. Also, an initial outer diameter D4 of the tube 36 is also increased during expansion to an installed outer diameter D5. As discussed above, the first 60 and second 62 ends of the tube 36 are slightly increased during radial expansion; however, inner and outer diameters at the first 60 and second 62 ends of the tube remain close to the initial inner diameter D1 and initial outer diameter D4 and are less than the installed inner diameter D3 and the installed outer diameter D5. This difference forms the shoulder 66, which abuts directly against an inner wall surface 70 of the axle beam 12 to mechanically lock the tube 36 to the axle beam 36 such that the tube 36 cannot be removed from the axle beam, as shown in FIG. 4.

Figure 5:
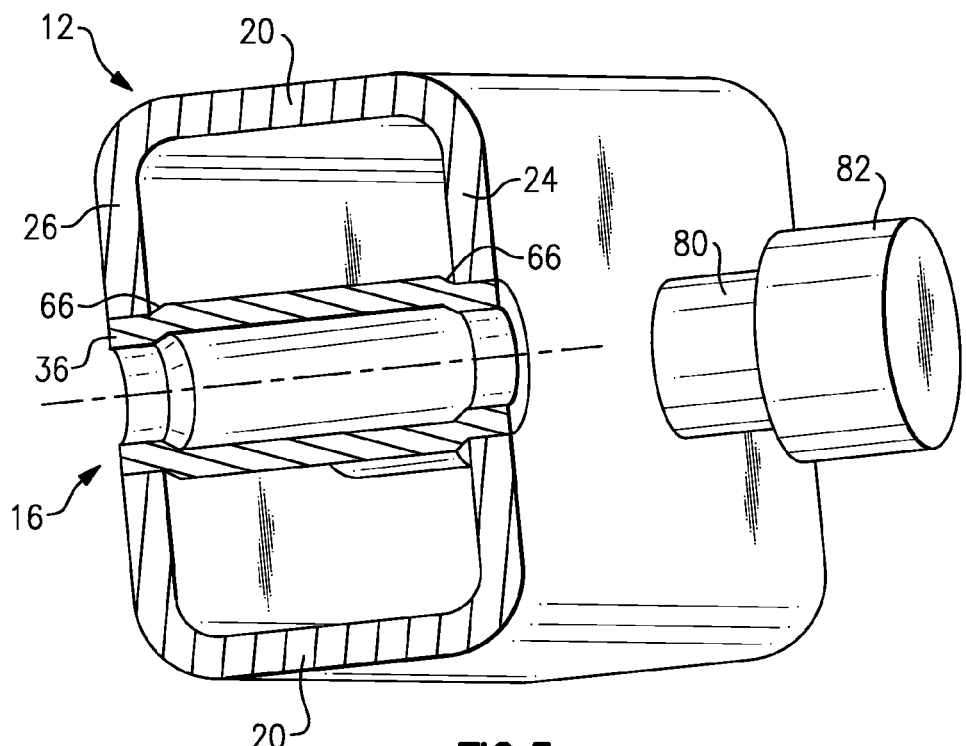
FIG. 5 is a cross-sectional view of a hollow beam structure and stiffener that is installed using a flowable medium.

FIG. 5 shows another example of a radial expansion process for the tube 36. In this example, the tube 36 is expanded in response to application of a highly pressured flowable medium. A flow tube 80 is coupled to the tube 36 and an applicator 82 introduces the highly pressurized flowable medium into the tube 36 causing expansion that results in the configuration shown in FIG. 4. The flowable medium can be an elastomer, hydraulic fluid, or any other type of flowable medium.

Figure 6:
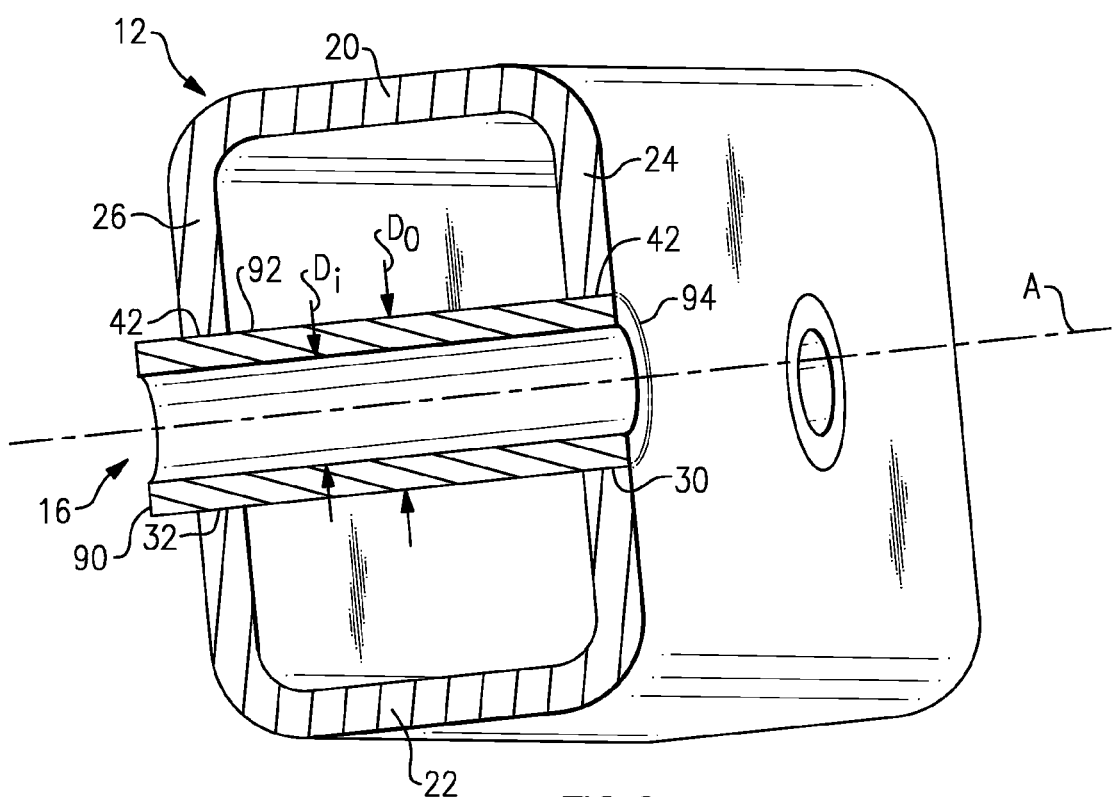
FIG. 6 is a partial cross-sectional perspective view of another example of a hollow beam structure and stiffener.

FIG. 6 shows another example of a stiffener 16 inserted into an axle beam. In this example, the stiffener comprises a tube 90 that is received within the first 30 and second 32 apertures. An outer peripheral surface 92 of the tube 90 abuts directly against the surface 42 that bounds the apertures when installed. The tube 90 is defined by a generally constant inner diameter Di and outer diameter Do along the entire length of the tube 90.

Once installed within the first and second apertures 30, 32, the tube is welded to the axle beam 12 to fix the tube 36 to the axle beam 12 at a weld attachment interface 94. Laser welding or electromagnetic pulse welding could be used, for example.

The stiffeners 16 provide a simple and easy way to increase the strength of a hollow axle beam without adversely affecting weight. Further, inserting a hollow tube stiffener through apertures formed within the beam body is a more cost effective solution than prior designs.

It should be understood that the enlarged head portion 54 of the tool 50 could also include various surfaces with slightly increasing diameters to slowly expand the tube 36, or multiple tools with increasing diameters could also be used.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An axle beam comprising:
    a hollow beam body comprising a single-piece structure having a continuous and uninterrupted outer peripheral surface;
    at least first and second apertures formed in opposing wall portions of said hollow beam body; and
    a stiffener having first and second ends that are respectively received within said first and second apertures, said stiffener being fixed to said hollow beam body at an attachment interface.

2. The axle beam according to claim 1 wherein said attachment interface comprises a weld attachment interface.

3. The axle beam according to claim 1 wherein said attachment interface comprises a press-fit attachment interface.

4. The axle beam according to claim 1 wherein said stiffener has a central portion extending from said first end to said second end through a hollow center of said hollow beam body.

5. The axle beam according to claim 1 wherein said stiffener comprises a tubular stiffener that is defined by an inner peripheral surface and an outer peripheral surface. and wherein said first and said second apertures are defined by an aperture surface, said outer peripheral surface of said tubular stiffener being in direct abutting contact with said aperture surfaces of said first and said second apertures.

6. The axle beam according to claim 5 wherein said tubular stiffener is radially expandable to form a mechanical lock that prevents said tubular stiffener from being removed from said hollow beam body.

7. The axle beam according to claim 6 wherein a portion of said tubular stiffener has an initial outermost diameter and a final outermost diameter that is greater than said initial outermost diameter, and wherein said tubular stiffener is expanded to said final outermost diameter subsequent to being inserted into said first and second apertures to form said mechanical lock.

8. The axle beam according to claim 7 wherein said portion of said tubular stiffener comprises a central portion that is located between first and second ends, and wherein said mechanical lock comprises shoulder portions that transition from said central portion to each of said first and said second ends.

9. The axle beam according to claim 1 wherein said single-piece structure has at least an upper wall, a lower wall, and said opposing wall portions that interconnect said upper and lower walls to form a hollow cavity.

10. The axle beam according to claim 1 wherein said single-piece structure defines an internal cavity that is completely enclosed when said first and second ends of said stiffener are inserted into said first and second apertures.

11. The axle beam according to claim 1 wherein said hollow beam body extends between laterally spaced wheel components and wherein said opposing wall portions of said hollow beam are longitudinally spaced apart from each other.

12. The axle beam according to claim 11 wherein said hollow beam body comprises a completely enclosed cavity when said stiffener is installed within said first and second apertures.

* * * * *